March 6, 1934. G. C. BURD 1,949,601
CABLE FITTING
Filed April 24, 1931
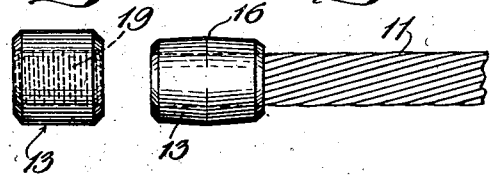
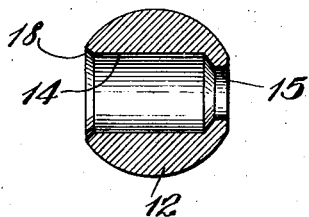
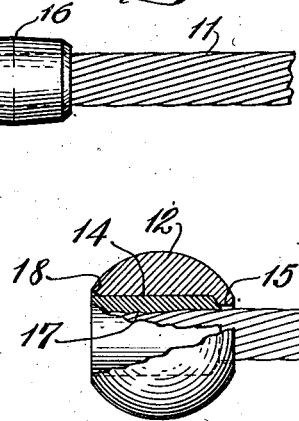
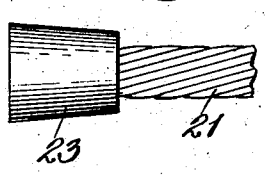
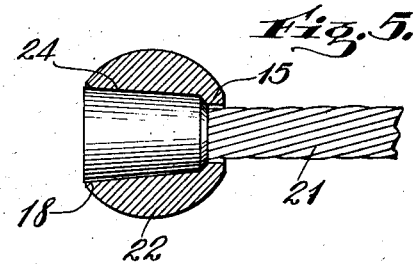
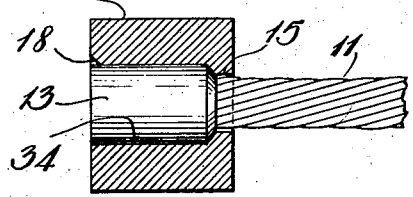
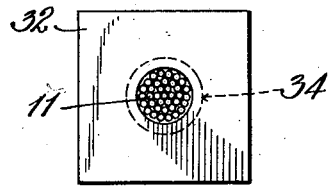
INVENTOR.
GORMAN C. BURD
BY
ATTORNEY Patented Mar. 6, 1934

1,949,601

UNITED STATES PATENT OFFICE

1,949,601

CABLE FITTING

Gorman C. Burd, Adrian, Mich., assignor to American Cable Company, Inc., a corporation of Delaware Application April 24, 1931, Serial No. 532,442

2 Claims. (Cl. 24—123)

This invention relates to stranded wire structures of the type including a plurality of wires laid together in helical relation to form what is commonly known as strand, and wire rope, formed of a plurality of such strands, and cables, formed of a plurality of such wire ropes, and has for an object the provision of an improved method for applying attachments of predetermined form to such stranded wire structures.

A more particular object of the invention is to provide a method especially adapted to provide wire strand, rope or cable with relatively small fittings having a spherical contour, which have a special utility when embodied in the operating cables for automobile brakes, and other fittings of special shapes and small dimensions, the application of which to stranded wire structures by conventional methods presents unusual difficulties.

For example, in applying small spherical fittings to wire brake cables by one well-known method which is characterized by an operation of impacting thereon a sleeve having a periphery of spherical contour, it has been found difficult, in operating upon small sizes of such fittings, to maintain the desirably true spherical contour of the fitting when the operation of swaging or impacting the fitting upon the cable is carried to the extent necessary to effect a union sufficiently perfect to develop the full strength of the cable under the strains commonly experienced by such cables in their intended use for operation of automobile brakes.

The improved method of the present invention overcomes this difficulty by providing a series of operations or steps which comprise the impactment upon the cable of a sleeve, preferably of cylindrical contour, in such a manner as to cause the flowing of the inner walls of the sleeve into the peripheral helical interstices of the underlying structure, and the subsequent operation of forcing upon the sleeve a separately formed fitting of proper small size and having the desired perfectly spherical contour, this fitting having an axial recess or bore slightly smaller in diameter than the exterior diameter of the sleeve upon which it is forced.

This method results in supplementing the impacting process by forcing the material of the sleeve further into the aforesaid peripherical helical interstices, fitting the voids thereof completely and resulting in a union of fitting and cable which is qualified to develop the full strength of the latter in use, while preserving the perfect spherical contour of the working surface of the spherical portion.

The above method can be utilized to advantage in the application to similar stranded wire structures of fittings or attachments having preformed shapes of desirable contours other than spherical shapes, such as cubes, etc.

The above, and other, features of the invention are illustrated and described fully in the accompanying drawing and specification, and are pointed out in the claims.

In the drawing,

Fig. 1 is a view in side elevation of parts of a brake cable with a fitting applied thereto by the method of the present invention, partly broken away to reveal interior structure.

Fig. 2 is a similar view of the same portion of cable, with a sleeve thereon constituting a component part of the fitting.

Fig. 3 is a view in vertical section of the spherical attachment member of the fitting, taken separately.

Figs. 4 and 5 are views, similar to Figs. 2 and 3, of the component parts of a modification.

Fig. 6 is a view in side elevation, partly in section, of another modification; and Fig. 7 is a view of the latter in end elevation.

Fig. 8 is a view in side elevation of a blank to be used in the formation of the sleeve shown in Fig. 2.

In a now-preferred embodiment of the invention selected for illustration and description, the part designated by the reference character 11 is a portion of wire cable, formed of wires laid together in helical relation, the same being an end-portion of a wire cable suitable for operating the brakes of an automobile, and to which a spherical fitting 12 is to be applied by the method of the present invention.

In pursuance of the invention, as the first operation in carrying the method into effect, the cable is provided with a sleeve 13, as shown in Fig. 2, made of suitable metal, such as mild steel, capable of cold-flowing, and which is preferably secured in place by the process of cold impactment, performed preferably according to the process set forth in United States Letters Patent No. 1,643,150, by which the material of the inner walls of the sleeve is flowed into the peripheral helical interstices between the component wires of the cable, forming an intimate union with the underlying structure.

Such a sleeve is thus provided, for the reason primarily that it is practically impossible to apply a spherical sleeve directly to such a wire cable by direct impactment of the sphere, for the reason that the presence of the cable 11 interferes with the turning movements necessary to complete the impactment of the sphere in certain radial directions, as will be readily understood by those skilled in the art, and there are other difficulties which need not be explained in detail, except to note that such difficulties are aggravated, in the instance of the present application, by the restricted dimensions of the completed structure, which in actual practice are less than one-half of the proportions shown in Fig. 1 of the drawing, and by the further requirement that there shall be no substantial projections beyond the periphery of the sphere.

Ordinarily, in processing such a sleeve as that shown at 13 upon a wire cable, the blank sleeve is preferably of somewhat longer and thicker proportions than those of the blank shown in Fig. 8 of the drawing, to permit a more extensive flowing of the material under impactment, producing a longer region of contact between the sleeve and cable than that shown in Fig. 2, so as to secure a union that will develop the full strength of the cable under the strains encountered by such a fitting in use, without displacement of the sleeve.

In further pursuance of the invention, for the purpose of securing the desired strength of union with the cable, the spherical member 12 is provided with an axial recess or bore 14 which is slightly smaller in diameter than the exterior diameter of the sleeve 13, and the sphere is forced upon the sleeve endwise, serving, when so applied, to constrict the sleeve still more upon the underlying cable, and to hold it under compression, thus driving the material of the sleeve further into the helical peripheral interstices of the cable, filling the voids thereof completely and thus reinforcing the union between the sleeve and cable produced by the initial operation of impactment, but without any substantial flowing of the sleeve lengthwise.

In practice, the axial bore 14 preferably terminates in a shoulder 15 of annular form, which constitutes an abutment adapted to aid in resisting displacement of the fitting when draft is exerted upon the outstanding portion 11 of the cable.

The outer mouth 18 of the axial bore 14 may be countersunk slightly, as indicated, affording another abutment against which the outer end of the sleeve may be expanded, and this also will aid to resist lengthwise displacement of the cable, by permitting the ends of the component wires to be upset somewhat.

It is to be noted that in practice, a slight swell may exist at a medial portion of the periphery of the sleeve 13, after the operation of impactment, as indicated at 16, where a somewhat exaggerated swelling is shown, for clearness of illustration, and this swelling is converted into a corresponding depression 17 in the periphery of the underlying cable, after the sphere 12 has been forced upon the sleeve, so that the union between the sleeve and cable is strengthened still further, compensating for the relatively short contact between the sleeve and cable.

The grip of the sleeve 13 upon the cable 11 may also be strengthened by providing the inner walls of the sleeve with a thread 19, as illustrated, or otherwise roughening said inner walls.

For a similar purpose, the compressive action of the sleeve may be accentuated by making it of somewhat tapering form, as shown in the modification illustrated in Figs. 4 and 5, where a tapered sleeve 23 is provided, and forced into a tapered bore 24 in a spherical fitting 22 which may be otherwise formed as already described, and applied to the cable 21 by the method of the present invention.

Other modifications may be adopted in carrying the invention into effect, as, for example, by the use of a fitting having a preformed shape of any desired and suitable non-spherical contour, such as the cubical form illustrated at 32 in Figs. 6 and 7, which is in other respects formed like the spherical fitting already described, having an undersized socket 34 adapted to receive compressively the sleeve 13 upon a cable 11 like that already described, and so bearing the same reference characters.

The expression "cable" as used in the following claims is employed in a generic sense to designate a stranded wire structure comprising an assembly of wires, rather than with any technical limitation to an assembly of individually formed wire ropes.

I claim:

1. A stranded wire structure provided with a fitting comprising a sleeve member holding said stranded wire structure under compression, and a fitting member of annular shape and formed with continuous walls, said fitting member holding said sleeve member under a degree of compression corresponding substantially to that incident to a force-fit.

2. A stranded wire structure provided with a fitting comprising a sleeve member holding said stranded wire structure under compression, and a fitting member of annular shape and formed with continuous walls, said fitting member holding said sleeve member under a degree of compression corresponding substantially to that incident to a force-fit, said fitting member also having a shoulder overlapping one end of said sleeve.

GORMAN C. BURD.